United States Patent Office 3,167,531
Patented Jan. 26, 1965

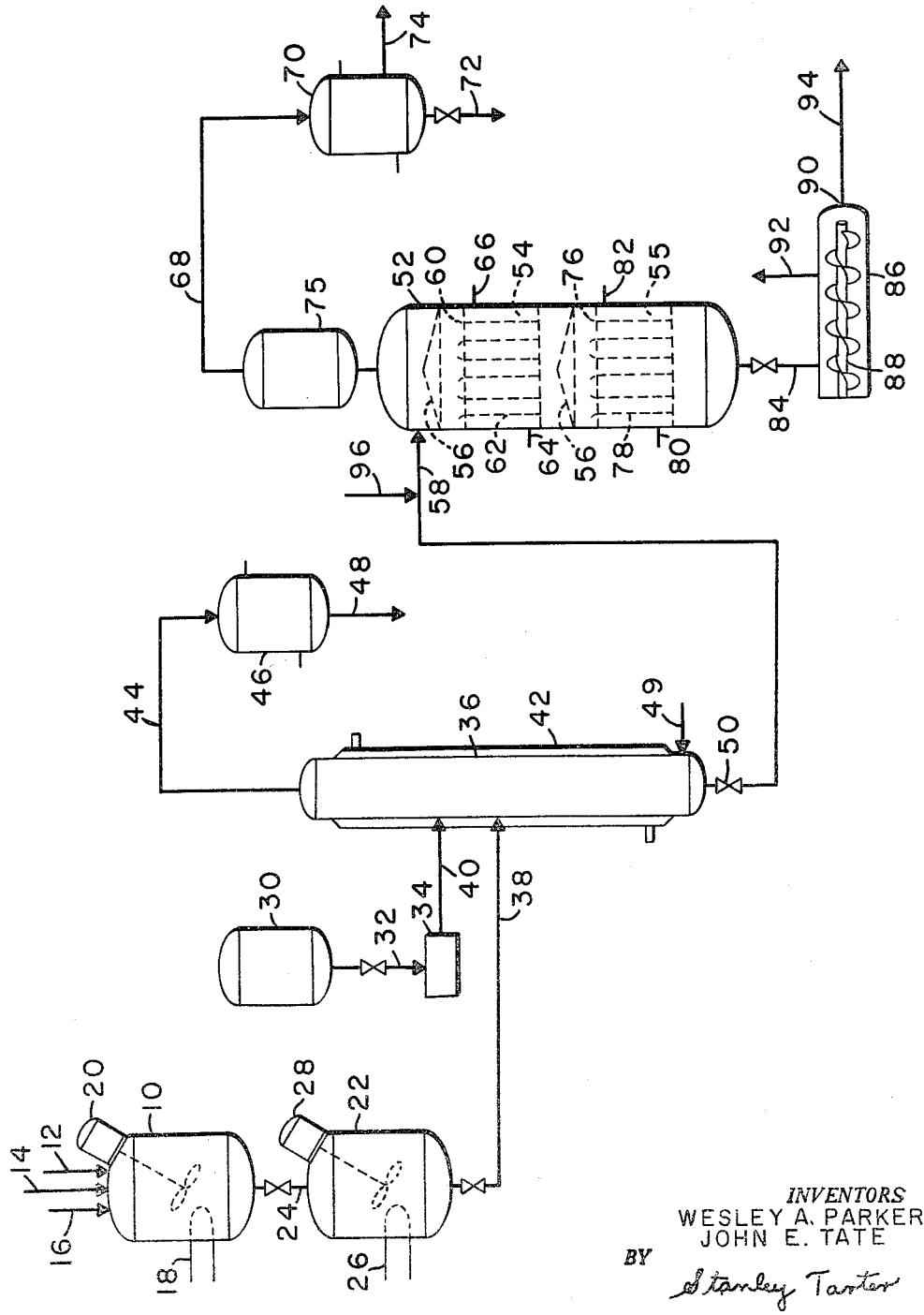

3,167,531
CONTINUOUS PROCESS FOR THE MANUFACTURE OF BIS(2-HYDROXYETHYL) TEREPHTHALATE AND LOW MOLECULAR WEIGHT POLYMERS THEREOF
Wesley A. Parker, Knoxville, Tenn., and John E. Tate, Pensacola, Fla., assignors, by mesne assignments, to Monsanto Company, a corporation of Delaware
Filed Jan. 24, 1962, Ser. No. 168,496
8 Claims. (Cl. 260—75)

This invention relates to the manufacture of glycol esters of terephthalic acid and, more particularly, to a process for the manufacture of bis(2-hydroxyethyl) terephthalate and low molecular weight polyethylene terephthalate.

Polyethylene terephthalate resins possess attractive film- and fiber-forming properties. Today these resins are prepared commercially by first ester interchanging ethylene glycol and the dimethyl ester of terephthalic acid to form bis(2-hydroxyethyl)terephthalate and by thereafter polycondensing this resulting terephthalate into high polymers. To overcome certain disadvantages of producing the resins by discontinuous processes, several continuous methods have been advanced. While the known continuous methods represent notable advances in the art, unfortunately the time of process holdup of the reactants is longer than would be desired. Because of this slow rate, it has been found that undesirable products, such as diethylene glycol, higher polymeric glycol, and by-products of the main reaction are produced, all of which tend to lower the quality of the polyethylene terephthalate.

Moreover, the molecular structure of the aforesaid linear polyesters has been modified recently so as to utilize them better for specific and new uses and to impart improved dyeing properties, etc. to the polymer. The modification is accomplished by including in the polyester-forming reactants small amounts of certain additives that become an integral part of the molecules constituting the polymers. Several such additives are mentioned hereinbelow. These additives, when employed with the relatively long process holdup time of the known processes, tend to deteriorate readily, giving rise to an unwanted, off-colored product.

Therefore, it is a primary object of the present invention to provide a new and improved continuous process for the production of bis(2-hydroxyethyl) terephthalate and low molecular weight polymers thereof.

Another object of the present invention is to provide a new and useful continuous process in which the time for producing bis(2-hydroxyethyl) terephthalate is significantly reduced, thereby resulting in increased productivity with process vessels of suitable size and permitting a better use of polymer modifying agents.

Other objects may become apparent from the following detailed description.

In accordance with the present process, a molten lower dialkyl ester of terephthalic acid, such as dimethyl terephthalate, and molecular excess ethylene glycol are brought into reacting contact in the presence of a catalytic amount of an ester-interchange catalyst under ester-interchanging conditions. The terephthalate, glycol and catalyst are fed continuously to an ester-interchange reaction zone filled with small solid inert bodies that interfere with the liquid flow therein and provide a large surface area over which the liquid flows in a tortuous path. The surface area of the bodies is large enough to provide a static holdup of at least 40 percent of the reactants therein. The reaction product composed of a mixture of bis(2-hydroxyethyl) therephthalate and excess glycol is continuously removed from the reaction zone. The reaction product is then continuously moved through a prepolymerization zone in the form of a thin film. This film is subjected to conditions to induce the bis(2-hydroxyethyl) terephthalate to be polymerized to a polymer exhibiting about 8 to 16 degrees of polymerization and to evaporate the excess ethylene glycol therefrom. The resulting low molecular weight polyethylene terephthalate is readily polymerized into polyesters that are capable of being formed into filaments, fibers, films and the like, and that, when drawn, show molecular orientation along the axis thereof, as revealed by characteristic X-ray patterns. The present process is particularly advantageous, when certain materials that form part of the molecular chain and modify the properties of the ultimate polymer, for example, in regard to dye receptivity, are incorporated in the initial reactants.

First, the reactants are prepared for the continuous operation of the process. Dimethyl terephthalate or other suitable lower dialkyl ester of terephthalic acid is heated to the liquid phase. The minimum temperature to which the dimethyl terephthalate is heated will be a temperature sufficient to melt same. The maximum temperature will be below that at which degradation of the dimethyl terephthalate occurs to an appreicable extent. However, a temperature of the order of about 142 to 152° C. is preferred. Ethylene glycol is supplied from a source and is fed to the ester-interchange zone separately from the molten dimethyl terephthalate being fed to such zone. On the way to the zone the glycol normally will be preheated, preferably to the temperature of 140 to 180° C. While it is preferred to preheat the glycol so that the ester-interchange reaction proceeds in an advantageous manner, it is not essential to do so. Neither is it critical to feed the glycol to the zone separately from the dimethyl terephthalate. These reactants can be premixed, but transesterification before the reactants reach the zone ought to be limited for best results. Generally, it is desirable to initiate the reaction by adding a large excess of ethylene glycol. After equilibrium conditions have been established in the reaction zone, a molar ratio of ethylene glycol to dimethyl terephthalate of 2.0:1 to 4.0:1, and preferably of about 3.8:1, is employed. If desired, a transesterification catalyst and polymer modifying additives may accompany the reactants to the zone or may be added separately to the zone.

A suitable transesterification catalyst normally will be employed in the continuous process of the invention, since in the absence of a catalyst the reaction normally proceeds at an undesirably slow rate. Zinc acetylacetonate and zinc acetate have been found to be particularly useful as catalysts for this process. Other suitable catalysts include, for example, litharge, alkali metals and their hydrides and certain compounds of certain metals, such as, calcium, zinc, lanthanum, manganese, and cobalt, which are known in the art as being useful for catalyzing the ester-interchange reaction between ethylene glycol and dimethyl terephthalate.

It has been found advantageous to incorporate in the initial reactants certain materials that form an integral part of the molecular chain and modify the properties of the ultimate polymer, for example, in regard to dye receptivity. Such modifying materials include those aromatic compounds which in addition to possessing two functional or reactive groups such as hydroxyl, carboxyl, or esters thereof, also possess a sulfonic acid group, salts, or esters thereof, a sulfonamide group, or other sulfonic acid derivatives which under the conditions employed in dyeing polyesters with basic dyestuffs revert to sulfonic acid or a salt thereof. Compounds of this class which have been found useful in this connection are carboxyaryl, carboalkoxyaryl, arylalkanol, acyloxyalkylaryl, and aroylhalide sulfonic acids, salts thereof, sulfonamides, and the like. Useful specific agents of this type for employment in this invention are the sodium and potassium salts of 2,5- and 3,5-dicarbomethoxybenzene sulfonic acid. Representative agents of this type include: dicarboxyaryl compounds of the general formula:

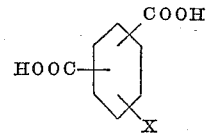

wherein X is SO₂OH, salts thereof, or SO₂NH₂, such as 3,5- and 2,5-dicarboxybenzenesulfonic acid; sodium and potassium 3,5- and 2,5-dicarboxybenzene sulfonate; dicarboxybenzene sulfonamide; dicarboxynaphthalene sulfonic acid; and the sodium and potassium salts thereof; dicarboxyaryl esters of the general formula:

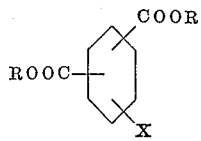

wherein R is an alkyl radical of 1 to 5 carbon atoms and X has the significance set forth above as, for example, 3,5- and 2,5-dicarbomethoxybenzene sulfonic acid; dicarboethoxybenzene sulfonic acid; dicarbopropoxybenzene sulfonic acid; dicarbobutoxybenzene sulfonic acid; and potassium and sodium salts thereof; 3,5-dicarbomethoxybenzene sulfonamide; dicarbomethoxynaphthalene sulfonic acid and sulfonamide; and the potassium and sodium salts thereof; aryl dialkanols of the general formula:

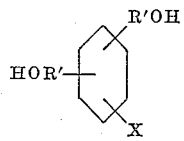

wherein R' is a polyvalent aliphatic radical such as an alkylene radical containing 1 to 10 carbon atoms and X is as above, such as 3,5- and 2,5-di-beta-hydroxyethylbenzene sulfonic acid; di-4-hydroxybutylbenzene sulfonic acid; and sodium and potassium salts thereof; dihydroxymethylbenzene sulfonamide; dihydroxymethylnaphthalene sulfonic acid and sulfonamide; and the potassium and the sodium salts thereof; esters of the aryldialkanols of the general formula:

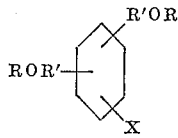

wherein R' is a divalent aliphatic radical such as an alkylene radical containing 1 to 10 carbon atoms, R is an acyl radical containing 1 to 5 carbon atoms, and X is as above such as 3,5- and 2,5-diacetoxymethylbenzene sulfonic acid and sulfonamide; dibutoxymethylbenzene sulfonic acid; and sodium and potassium salts thereof; 3-hydroxymethyl-5-acetoxymethylbenzene sulfonic acid; and alkali metal salts thereof; compounds of the general formula which may be derived from alkylene oxides:

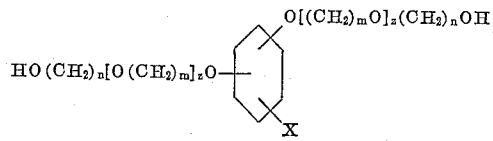

wherein $m$ and $n$ are integers from 1 to 22, $z$ is an integer from 1 to about 100 and X is as above, such as sodium di(p-omegahydroxypolyoxyethyleneoxy) benzene sulfonate of molecular weight from about 500 to 5000, preferably 1000 to 3500 and esters thereof of aliphatic monocarboxylic acids of 1 to 5 carbon atoms; compounds of the formula:

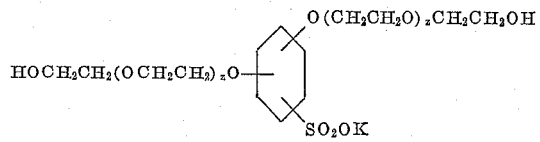

wherein $z$ is an integer from 1 to 5, and esters thereof of aliphatic monocarboxylic acids containing 1 to 5 carbon atoms; such compounds may be derived from alkylene oxides such as ethylene oxide, propylene oxide, butylene oxide, hexamethylene oxide, decamethylene oxide, and the like and from mixtures thereof; dicarbonylhalidebenzene sulfonic acids and the potassium and sodium salts thereof such as 2,5- and 3,5-dicarbonylchloridebenzene sulfonic acid; and the like. Also useful are mixtures of the above materials, as well as the materials represented by the general formulas:

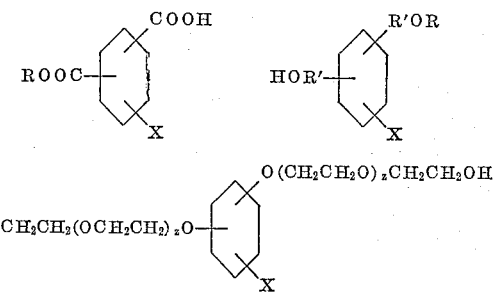

wherein $z$, R', R and X have the significance set forth above; and the like.

Also contemplated are polymer modifying compounds of the general formulas:

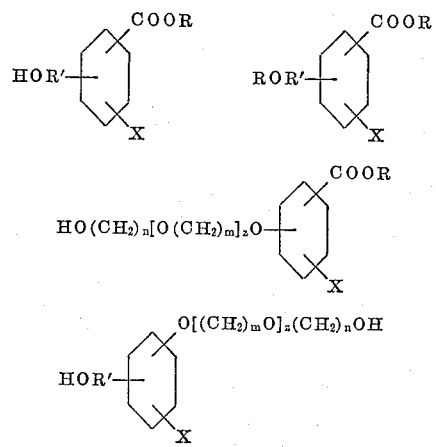

and the like wherein, R, R' $m$, $n$ and $z$ have the significance set forth above.

These compounds may be represented by the general formula:

wherein A is an aromatic nucleus such as phenyl, napthyl, and the like; Y and Z are radicals selected from the group consisting of COOH, COOR, wherein R is an alkyl radical containing 1 to 5 carbon atoms, R'OH wherein R' is a polyvalent aliphatic radical such as an alkylene radical containing 1 to 10 carbon atoms, R'OR wherein R' is a polyvalent aliphatic radical such as an alkylene radical containing 1 to 10 carbon atoms and R is an alkyl radical containing 1 to 5 carbon atoms, O[(CH₂)ₘO]$_z$(CH₂)ₙOH, wherein $m$ and $n$ are integers from 1 to 22, and $z$ is an integer from 1 to about 100 and esters thereof,

wherein R is an acyl radical of 1 to 5 carbon atoms and COCl, and X is a radical selected from the group consisting of SO$_2$OH, salts thereof, and SO$_2$NH$_2$ and are useful for modifying the ultimate polyester. The salt of the sulfonic acid groups may be any suitable metal salt or ester of an organic reagent but more preferably are the salts of an alkali metal. These difunctional agents may be employed in amounts ranging from about 0.01 mol percent to about 5.0 mol percent, based on the amount of dimethyl terephthalate employed in the reaction mixture. More preferred amounts are about 0.1 to about 2.0 mol percent.

Other modifying additives include certain monohydric polyalkylene oxides and hydroxyl polyalkylvinyl esters, preferably having a terminal hydroxy group. Suitable monohydric polyalkylene oxides are those having the general formula:

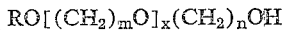

wherein R is an alkyl group containing 1 to 18 carbon atoms or an aryl group containing 6 to 10 carbon atoms, $m$ and $n$ are integers from 1 to 22, and $x$ is a whole number indicative of the degree of polymerization, that is, $x$ could be an integer from 1 to about 100 or greater. As examples of substances having the above formula there may be named methoxypolyethylene glycol, methoxypolyhexamethylene glycol, methoxypolydecamethylene glycol, methoxypolyethylenebutylene glycol, ethoxypolyethylene glycol, propoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxymethylene glycol, methoxypolyethylenepropylene glycol, and the like or suitable mixtures thereof. Suitable polyalkylvinyl esters having one terminal hydroxy group are the addition polymers usually prepared by the polymerization of alkylvinyl esters wherein the alkyl group contains from one to four carbon atoms. Examples of such monofunctional agents are hydroxy polymethylvinyl ether; hydroxy polyethylvinyl ether; hydroxy polypropylvinyl ether; hydroxy polybutylvinyl ether; and the like. These agents or compounds may be employed in amounts ranging from 0.1 mol percent to about 5.0 mol percent, based on the amount of dimethyl terephthalate employed in the reaction mixture. More preferred are amounts of about 0.1 to 2.0 mol percent. It is understood of course that simple esters of low boiling point aliphatic monocarboxylic acids such as acetic, propionic, and the like may also be used. The weight percent of these monofunctional agents which are employed in this invention will vary with the molecular weight of the agent. The range of average molecular weights of these monohydric agents suitable for use in this invention is from about 500 to 5000, with those agents having a molecular weight in the range of about 1000 to 3500 being preferred.

Additional additives that may be employed to modify the polyesters are the polyols which have a functionality greater than two, that is, they contain more than two functional groups as hydroxy or esters thereof such as in pentaerythritol. Examples of other suitable compounds are compounds having the general formula:

$$R(OH)_n$$

wherein R is a polyvalent aliphatic radical such as an alkyl group containing from 3 to 6 carbon atoms and $n$ is an integer from 3 to 6, for example, glycerol, sorbitol, and the like; compounds having the general formula:

wherein R is a polyvalent aliphatic radical such as an alkyl group containing from 2 to 6 carbon atoms, for example, trimethylol ethane, trimethylol propane, and like compounds up to hexane; and compounds having the formula:

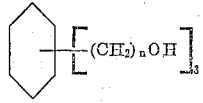

wherein $n$ is an integer from 1 to 6, including compounds of the above formula such as trimethylol benzene-1,3,5, tripropylol benzene-1,2,6, and the like. All of the above polyols may also be used in the form of simple esters of low boiling aliphatic monocarboxylic acids containing preferably 5 or less carbon atoms such as acetic, preferably, propionic, and the like.

Aromatic polyfunctional acid esters may also be profitably employed in place of or in addition to the polyols, particularly those having the formula:

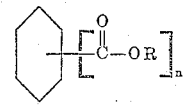

wherein $n$ may be from three to five carboalkoxy groups, such as methoxy groups, attached to the carbon atoms of the ring which may be any aryl compound, and the alkoxy groups preferably contain hydrocarbon radicals containing 1 to 5 carbon atoms. As examples of compounds having the above formula there may be named trimethyl trimesate, triethyl trimesate, and tripropyl trimesate, tetramethyl pyromellitate, tetramethyl mellophanate, trimethyl hemimellitate, trimethyl trimellitate, tetramethyl prehnitate, and the like. In addition, there may be employed mixtures of the above esters and esters of mixtures of alcohols. In most instances, when preparing any of the compounds having the above formula, other related compounds having the same formula may be present in small amounts as impurities. This does not prevent use of the reaction product as a chain branching agent in the practice of the present invention.

These polyols and esters may be employed in the process of the present invention in amounts ranging from 0.01 mol percent to about 2.4 mol percent, based on the amount of dicarboxylic acid employed in the reaction mixture. The preferred range of these agents for use in the present invention is from 0.1 to about 1.0 mol percent. Mixtures of the polyols and esters have been found to be valuable. The trimethyl trimesate, pentaerythritol, and sorbitol are preferred agents and normally are employed in amounts from about 0.1 to 0.7 mol percent based on the mols of dimethyl terephthalate.

A suitable transesterification reaction zone is provided by a packed column of the type that at least 40 percent of the process holdup is static. By static holdup is meant that portion of the normal holdup which remains in the column when the flow through the column is reduced to zero.

Preferably the percentage static holdup is 40 to 80. Particularly suitable is a vertically elongated column filled with conventional tower packing placed in the column either in a random or systematic manner. The packing causes the reactants to follow tortuous paths which facilitate the transesterification reaction. Furthermore, the packing provides a large surface area sufficient that the required static holdup is maintained in the column. Suitable packing includes conventional Raschig rings, Berl saddles, Intalox saddles, Hechenbleikner blocks, corrugated Raschig rings, partition rings, spiral rings, Nielsen propeller types, hexahelix packing, and the like.

The reactants moving through the column are heated to a transesterification temperature of about 170 to 195° C. A most preferred temperature is about 175–185° C.

However, it has also been found that temperatures up to 250° C. are useful in further improving the reaction rate if pressures above atmospheric are utilized and the pressure is maintained sufficiently high to prevent boiling of the ethylene glycol component in the column. That is, if temperatures above 195° C. are desired, the column pressure should always be maintained high enough so that the boiling point of ethylene glycol remains well above the temperature of any portion of the reaction zone or ester interchange column or vessel. At these temperatures ester-interchange occurs between the dimethyl terephthalate and ethylene glycol with the production of bis(2-hydroxyethyl) terephthalate and the liberation of methanol. Methanol is removed overhead and collected as a by-product, if desired. An inert gas, such as nitrogen, helium or the like may be passed through the column to remove the methanol more effectively therefrom, but this is not necessary. In one embodiment the reactants enter the packed column near the top thereof and react while being gravitated toward the bottom thereof. The column is peripherally heated in a suitable manner so that proper reaction temperatures are maintained in the ester-interchange zone.

The process flow rates are controlled so that economic production of bis(2-hydroxyethyl) terephthalate is attained. Normally, the process holdup time is in the range of about 20–40 minutes, preferably 23–25 minutes. The pressure in the column can be in the range of 760 to 7600 mm. of Hg absolute, although subatmospheric pressure may be employed under some conditions.

The reaction product of the ester-interchange zone composed of bis(2-hydroxyethyl) terephthalate, excess glycol, and modifiers if added, is caused to flow continuously to and through a precondensation zone where oligomers of ethylene terephthalate are formed with the liberation of ethylene glycol. In particular, the reaction product is moved in a thin film or films in contact with a heated surface to maintain the required condensation temperatures. To facilitate removal of ethylene glycol atmospheric or subatmospheric pressure will normally be employed. Preferably, in the precondensation zone the material is flowed into a plurality of successive films, each being heated to a higher temperature than the film preceding it. For example, the reaction product is caused to move in a first film heated to about 180–210° C. The process pressure on this first film is maintained at about 90–760 mm. of Hg absolute, preferably about 460–500 mm. of Hg absolute. Under these conditions ethylene glycol is removed in 1–10 minutes, normally 2–3 minutes. For economic reasons provisions are made to recover and reuse the glycol.

Next, the reaction product is caused to move in a second film heated to about 240–280° C., preferably about 272–278° C. The process pressure on the second film may be the same to which the first film is subjected. Ethylene terephthalate with a degree of polymerization of about 8–16 and ethylene glycol are produced in about 1–10 minutes, normally 4–6 minutes.

A suitable precondensation zone is provided in the use of two vertically mounted shell and tube heat exchangers which function as falling film evaporators, one disposed above the other.

As indicated above, the product of the second falling film is polyethylene terephthalate with 8–16 degrees of polymerization, a melting point of 238–242° C., and excellent color. The low molecular weight polymer is readily polymerizable to condensation polymers having specific viscosities in the order of 0.2 to 0.6. This represents the fiber- and film-forming polymer. It is to be understood, of course, that non fiber-forming polyesters can be produced which have a greater or less melt viscosity than that just stated. For example, the production of polyesters which are useful in coating compositions, lacquers, and the like is within the scope of the present invention.

Specific viscosity, as employed herein, is represented by the formula:

$$N_{sp.} = \frac{\text{Time of flow of the polymer solution in seconds}}{\text{Time of flow of the solvent in seconds}} - 1$$

Viscosity determinations on the polymer solutions and solvent are made by allowing said solutions and solvent to flow by force of gravity at 25° C. through a capillary viscosity tube. In all determinations of polymer solution viscosities, a polymer solution containing 0.5 gram of the polymer dissolved in 100 ml. of a solvent mixture containing two parts by weight of phenol and one part by weight of 2,4,6-trichlorophenol, and 0.5 percent by weight of water based on the total weight of the mixture, is employed.

The polyesters made from the products of this invention can be formed into filaments and films by conventional melt spinning and casting methods to yield products that can be subsequently cold drawn to the extent of several hundred percent of their original lengths, whereby molecularly oriented structures of high tenacity can be obtained. The condensation product can be cooled and comminuted followed by subsequent remelting and processing to form filaments, films, molded articles, and the like.

Alternatively, the polyesters made from the products of this invention can be processed to shaped objects by the wet spinning method, wherein the polyesters are dissolved in a suitable solvent and the resulting solution extruded through a spinneret into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

In order to obtain a more complete understanding of the present invention, reference is now made to the accompanying drawing which is a schematic representation of a processing system and apparatus particularly suitable for carrying out the present invention. It, of course, will be recognized that other suitable apparatus may also be employed.

In the process a dimethyl terephthalate melt tank 10 is employed. Dimethyl terephthalate is supplied to this tank from a suitable source via a conduit 12 in a predetermined amount. A catalyst and polymer modifiers enter the tank by way of conduits 14 and 16, respectively, although they may be brought into the system at other places. The ingredients in the tank are heated by means of a heater 18 and stirred by means 20. The melt prepared in tank 10 is fed to a feed tank 22 via line 24. The melt in tank 22 is heated by means of a heater 26 and stirred by means 28.

Ethylene glycol is supplied from reservoir 30 by way of line 32 to line heater 34 so that the temperature of the glycol is raised prior to reaction.

Dimethyl terephthalate melt and ethylene glycol in predetermined amounts and rates enter an ester interchange column 36 near the top thereof by way of lines 38 and 40, respectively. Column 36 contains suitable packing so that at least 40 percent of the process holdup is static. The column is heated by a peripheral heater 42 which may be a jacket containing a heating fluid caused to move in heat exchanging relation with the column or which may be a heater of the electric resistant type or the like. The reactants gravitate down the column and over the surfaces of the packing resulting in the formation of methanol and bis(2-hydroxyethyl) terephthalate. Methanol vapors are removed overhead and flow through a line 44 to a condenser 46. Methanol in the liquid phase is flowed to a point of collection by means of line 48. Inert gas supplied through line 49 can be used to sweep out the methanol from the column, although this is not necessary.

Valve 50 controls the flow of the ester interchange product from the bottom of column 36 to a prepolymerization column 52. To obviate the need of pump means for moving the product from column 36 to column 52, the former can be positioned above the latter. Within column 52 are two vertically mounted shell and tube heat exchangers 54 and 55, each of which has an overhead baffle plate 56 for diffusing the liquid flow. The ester interchange product being discharged from line 58 into column 52 will overflow annular lips 60 and gravitate down the tubes 62 of exchanger 54 in the form of a plurality of thin annular films. A heating fluid moves in heat exchanging relation through the shell of the exchanger. Fluid outlet and inlet are provided by lines 64 and 66. Excess ethylene glycol disengages from the ester interchange product and moves as a vapor through line 68 to condenser 70. Ethylene glycol in the liquid phase flows to a point of collection by means of line 72. The system is connected to suitable vacuum producing equipment by means of line 74 so that a predetermined subatmospheric pressure can be maintained therein. A bubble cap column 75 may be installed above column 52 to prevent any flash losses of bis(2-hydroxyethyl) terephthalate while allowing rapid removal of excess glycol.

From the first exchanger the product will overflow annular lips 76 and will flow down the tubes 78 of heat exchanger 55 in the form of a plurality of thin-films. A heating fluid moves in heat exchanging relation through the shell of the exchanger. Fluid outlet and inlet are provided by lines 80 and 82. The material discharged from the bottom of column 52 by way of line 84 is polyethylene terephthalate of about 8–16 degrees of polymerization. This product is readily polymerized to fiber-forming polyester by the use of screw finisher 86 of conventional construction. The product is conveyed through the finisher by screw 88 to its exit 90. The extruder is heated by means not shown and is connected by way of line 92 to suitable vacuum producing equipment so that polycondensation proceeds to the desired extent. The finished polyester is flowed by means of line 94 to suitable filament-forming means or film casting means (not shown). If desired, a delustrant or the like can be incorporated in the system through conduit 96.

The invention is further illustrated by the following exemplary example in which the process is carried out in an apparatus of the type shown in the drawing. All parts and percentages are on a weight basis unless otherwise indicated.

*Example*

To the melt tank 10.1 parts per hour of dimethyl terephthalate were supplied. At atmospheric pressure the dimethyl terephthalate was heated at 140° C. and stirred until it melted. The melt was transferred to the feed tank to which 0.0089 part zinc acetate catalyst per hour was supplied. The resulting mixture was metered into the ester interchange column packed with Raschig rings at the same rate at which the materials were supplied to the melt tank. The temperature of the melt as it entered the column was 142° C.

Ethylene glycol was heated to 140° C. and metered into the ester interchange column at the rate of 12.0 parts per hour simultaneously with the dimethyl terephthalate melt. 0.606 part methoxypolyethylene glycol (M.W.=2000)

per hour and 0.0125 part of pentaerythritol per hour were metered into the ethylene glycol stream moving to the column. Methanol at a rate of 3.33 parts per hour was condensed from the vapors removed overhead from the column. The column was operated at atmospheric pressure and was heated peripherally so that the bottom product had a temperature of 180° C. The holdup time in the column was about 24 minutes. The bottom product was continuously moved to the precondensation column. The operating pressure in this column was 430 mm. of Hg. The reactants were heated by the two tube and shell heat exchangers of the type shown in the drawing so that the film leaving the second exchanger had a temperature of 260° C. Ethylene glycol was removed overhead as a vapor and condensed. The bottom product of the precondensation column was a modified polyethylene terephthalate having an average degree of polymerization of 12. Product holdup time was 3 minutes on the first exchanger and 5 minutes on the second exchanger. The bottom product of the the precondensation column was further polymerized in a screw finisher at 275° C. and at an absolute pressure of one mm. of Hg. The product of the finisher was extruded through a spinneret according to a conventional melt spinning procedure to produce filaments of excellent textile quality.

The present invention affords numerous advantages over the prior art processes. The present continuous process significantly reduces the time required to produce polyethylene terephthalate and particularly to produce a low molecular weight ethylene terephthalate of 8–16 degrees of polymerization. Objectionable side reactions producing diethylene glycol and higher polyglycols are reduced. The resulting polymer is purer and exhibits reduced degradation products. The process allows the use of modifying additives which would tend to degrade when held for the longer periods of time required by the prior art processes.

It is to be understood that changes and variations may be made without departing from the spirit and scope of the invention as defined in the appended claims.

What is claimed is:

1. A continuous process for the manufacture of low molecular weight polyethylene terephthalate comprising flowing molten dimethyl terephthalate and ethylene glycol as reactants into an ester-interchange zone containing small solid inert bodies that interfere with the liquid flow therein, the molar ratio of ethylene glycol to dimethyl terephthalate being about 2.0:1 to 4.0:1, continuously moving said reactants in a tortuous path through the ester-interchange zone in the presence of a catalytic amount of an ester-interchange catalyst, heating said reactants moving through said ester-interchange zone at a temperature of about 170 to 195° C. to form bis(2-hydroxyethyl) terephthalate and methanol, said bodies providing a large surface area sufficient to maintain a static holdup of about 40 to 80 percent of the reactants in said ester-interchange zone, continuously removing the methanol so-formed from said ester-interchange zone, continuously moving the reaction product of said ester-interchange zone through a prepolymerization zone in the form of a thin film, heating the film at about 180 to 280° C. at a pressure of about 90 to 760 mm. of Hg absolute until polyethylene terephthalate of about 8–16 degrees of polymerization is formed.

2. A continuous process for the manufacture of low molecular weight polyethylene terephthalate comprising flowing molten dimethyl terephthalate and ethylene glycol as reactants into an ester-interchange zone containing small solid inert bodies that interfere with the liquid flow therein, the molar ratio of ethylene glycol to dimethyl terephthalate being about 2.0:1 to 4.0:1, continuously moving said reactants in a tortuous path through the ester-interchange zone in the presence of a catalytic amount of an ester-interchange catalyst, heating said reactants moving through said ester-interchange zone at a temperature of about 175 to 195° C. to form bis(2-hydroxyethyl) terephthalate and methanol, said bodies providing a large surface area sufficient to maintain a static holdup of about 40 to 80 percent of the reactants in said ester-interchange zone, continuously removing the methanol so-formed from said ester-interchange zone, continuously moving the reaction product of said ester-interchange zone through a prepolymerization zone in two successively formed thin-films under a pressure of about 90 to 760 mm. of Hg absolute, heating the first formed film to about 180 to 210° C. and the second formed film to about 240–280° C. until polyethylene terephthalate of about 8–16 degress of polymerization is formed.

3. The process of claim 2 wherein the ester-interchange catalyst is zinc acetylacetonate.

4. The process of claim 2 wherein the ester-interchange catalyst is zinc acetate.

5. A continuous process for the manufacture of low molecular weight polyethylene terephthalate comprising flowing molten dimethyl terephthalate and ethylene glycol as reactants into an ester-interchange zone containing small solid inert bodies that interfere with the liquid flow therein, the molar ratio of ethylene glycol to dimethyl terephthalate being about 2.0:1 to 4.0:1, continuously moving said reactants in a tortuous path through the ester-interchange zone in the presence of a catalytic amount of an ester-interchange catalyst, heating said reactants moving through said ester-interchange zone at a temperature of 175 to 185° C. to form bis(2-hydroxyethyl) terephthalate and methanol, said bodies providing a large surface area sufficient to maintain a static holdup of about 40 to 80 percent of the reactants in said ester-interchange zone, continuously removing the methanol so-formed from said ester-interchange zone, continuously moving the reaction product of said ester-interchange zone through a prepolymerization zone in two successively formed thin-films under a pressure of about 460 to 500 mm. of Hg absolute, and heating the first formed film to about 180 to 210° C. and the second formed film to about 272 to 278° C. until polyethylene terephthalate of about 8–16 degrees of polymerization is formed.

6. A continuous process for the manufacture of low molecular weight polyethylene terephthalate comprising flowing molten dimethyl terephthalate into an ester-interchange zone containing small solid inert bodies that interfere with the liquid flow therein, the molar ratio of ethylene glycol to dimethyl terephthalate being about 2.0:1 to 4.0:1, continuously gravitating said reactants in a tortuous path downwardly through the ester-interchange zone in the presence of a catalytic amount of an ester-interchange catalyst, heating said reactants moving through said ester-interchange zone at a temperature of 175 to 185° C. to form bis(2-hydroxyethyl) terephthalate and methanol, said bodies providing a large surface area sufficient to maintain a static holdup of about 40 to 80 percent of the reactants in said ester-interchange zone and a process holdup time of 20 to 40 minutes, continuously removing the methanol so-formed from said ester-interchange zone, continuously moving the reaction product of said ester-interchange zone through a prepolymerization zone in two successively formed thin-films under a pressure of about 460 to 500 mm. of Hg absolute, heating the first formed film to about 180 to 210° C. and the second formed film to about 272 to 278° C. while removing vaporized ethylene glycol from the prepolymerization zone and until polyethylene terephthalate of about 8–16 degrees of polymerization is formed, the process holdup time of each film being 1 to 10 minutes.

7. A continuous process for the manufacture of low molecular weight polyethylene terephthalate comprising flowing molten dimethyl terephthalate into an ester-interchange zone, the molar ratio of ethylene glycol to dimethyl terephthalate being about 3.8:1, continuously gravitating said reactants downwardly through said ester-interchange zone in the presence of a catalytic amount of an ester-interchange catalyst, said ester-interchange zone containing small solid bodies inert to the reactants that interfere with the liquid flow therethrough and that provide a large surface area over which the liquid moves in a tortuous path, heating said reactants moving through said ester-interchange zone at a temperature of 175 to 185° C. to form bis(2-hydroxyethyl) terephthalate and methanol, said surface area being sufficient to maintain a static holdup of about 40 to 80 percent of the reactants in said ester-interchange zone maintaining a process holdup time of 20 to 40 minutes, continuously removing the methanol so-formed from said ester-interchange zone, continuously gravitating the reaction product of said ester-interchange zone through a prepolymerization zone in two successively formed groups of a plurality of annular thin-films under a pressure of about 460 to 500 mm. of Hg absolute, heating the first formed group of films to about 180 to 210° C. and the second formed group of films to about 272 to 278° C. while removing vaporized ethylene glycol from the polymerization zone and until polyethylene terephthalate of 8–16 degrees of polymerization is formed, the process holdup time of each group of films being 1 to 10 minutes.

8. A continuous process for the manufacture of low molecular weight polyethlylene terephthalate comprising flowing molten dimethyl terephthalate and ethylene glycol as reactants into an ester-interchange zone containing small solid inert bodies that interfere with the liquid flow therein, the molar ratio of ethylene glycol to dimethyl terephthalate being about 2.0:1 to 4.0:1, continuously moving said reactants in a tortuous path through the ester-interchange zone in the presence of a catalytic amount of an ester-interchange catalyst, heating said reactants moving through said ester-interchange zone at a temperature between 195° C. to 250° C. while maintaining a superatmospheric pressure sufficiently high to prevent boiling of the ethylene glycol so as to form bis(2-hydroxyethyl) terephthalate and methanol, said bodies providing a large surface area sufficient to maintain a static holdup of about 40 to 80 percent of the reactants in said ester-interchange zone, continuously removing the methanol so-formed from said ester-interchange zone, continuously moving the reaction product of said ester-interchange zone through a prepolymerization zone in the form of a thin film, heating the film at about 180 to 280° C. at a pressure of about 90 to 760 mm. of Hg absolute until polyethylene terephthalate of about 8–16 degrees of polymerization is formed.

References Cited in the file of this patent
UNITED STATES PATENTS 2,727,882     Vodonik _____ Dec. 10, 1955
2,829,153     Vodonik _____ Apr. 1, 1958